US007372020B2

(12) United States Patent
Gorbunov

(10) Patent No.: US 7,372,020 B2
(45) Date of Patent: May 13, 2008

(54) ION COUNTER

(76) Inventor: Boris Zachar Gorbunov, 20 Kings Park, Canterbury, Kent, CT1 1QH (GB)

( * ) Notice: Subject to any disclaimer, the term of this patent is extended or adjusted under 35 U.S.C. 154(b) by 414 days.

(21) Appl. No.: 10/531,236

(22) PCT Filed: Oct. 14, 2003

(86) PCT No.: PCT/GB03/04464

§ 371 (c)(1),
(2), (4) Date: Apr. 13, 2005

(87) PCT Pub. No.: WO2004/036617

PCT Pub. Date: Apr. 29, 2004

(65) Prior Publication Data

US 2006/0071163 A1 Apr. 6, 2006

(30) Foreign Application Priority Data

Oct. 14, 2002 (GB) ................................ 0223792.3

(51) Int. Cl.
*B01D 57/00* (2006.01)

(52) U.S. Cl. ....................... 250/287; 250/281; 250/282

(58) Field of Classification Search ................ 250/281, 250/282, 283, 287, 288, 423 R, 424, 423 F, 250/423, 489, 492.21
See application file for complete search history.

(56) References Cited

U.S. PATENT DOCUMENTS 4,378,499 A * 3/1983 Spangler et al. ............ 250/287
4,383,171 A * 5/1983 Sinha et al. ................ 250/282
4,588,889 A 5/1986 Naito
5,097,124 A 3/1992 Devienne
5,128,543 A * 7/1992 Reed et al. ................. 250/287
5,621,208 A * 4/1997 Pourprix ..................... 250/287
5,811,820 A * 9/1998 Kirchner et al. ........ 250/432 R
6,573,510 B1 * 6/2003 Vella ...................... 250/423 R
6,619,063 B1 * 9/2003 Brumett ....................... 62/264
6,895,339 B2 * 5/2005 Pusterla et al. ............... 702/24
7,081,619 B2 * 7/2006 Bashkirov et al. .......... 250/286
2005/0109929 A1 * 5/2005 Bashkirov et al. .......... 250/283

FOREIGN PATENT DOCUMENTS

EP 0 692 712 A1 1/1996

(Continued)

OTHER PUBLICATIONS

Zhang, et al. "Development of an electrostatic ion guide in chemical ionization mass spectrometry," Review of Scientific Instruments, vol. 69, No. 11, 1998 p. 4002-4003.*

(Continued)

*Primary Examiner*—Jack Berman
*Assistant Examiner*—Michael Maskell
(74) *Attorney, Agent, or Firm*—Kelley Drye & Warren LLP

(57) ABSTRACT

Ions in a steady flow sample are counted by colliding the ions in a mixing chamber with a numerical excess of uncharged or neutral aerosol particles, suitably glycerol, entrained in air, to transfer respective charges from the ions to charge individual aerosol particles and passing the gases through a separating chamber subjected to an electric field to direct the charged aerosol particles to impinge upon an optical particle counter.

32 Claims, 2 Drawing Sheets

FOREIGN PATENT DOCUMENTS

Figure 1:
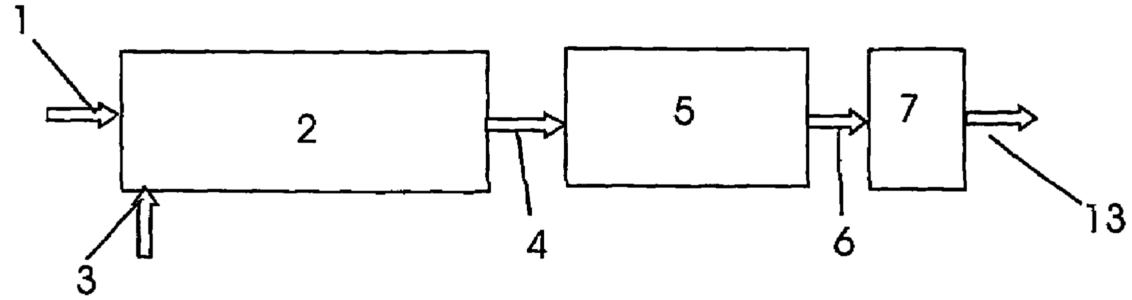

| | | | |
|---|---|---|---|
| JP | 61093544 A | * | 5/1986 |
| JP | 61239186 A | | 10/1986 |
| JP | 2162251 A | | 6/1990 |

OTHER PUBLICATIONS

Bassi, et al. "Ion-molecule-reaction mass spectrometer for on-line gas analysis," J. Vac. Sci. Technol. B 16(1) Jan./Feb. 1998, pp. 114-122.*

G.A. Eiceman, Ion-mobility spectrometry as a fast monitor of chemical composition, Trends In Analytical Chemistry, 2002, pp. 259-275, vol. 21, No. 4, Elsevier Science B.V.

* cited by examiner

ION COUNTER

This invention relates to method and apparatus for counting ions in a sample. More particularly, the invention relates to quantifying extremely low concentrations of ions in a gaseous medium.

In the book titled "Plasma chromatography" Edited by T. W. Carr and published in 1984 by Plenum Press (N-Y, London) there is described the measurement of concentrations of ions and molecules in a gas medium by means of electric current detection with an electrometer or other current detecting device. In a conventional electrical detector, based upon the Faraday cup, ions impinge on the collector and carry an electric charge. The voltage drop across the standard resistor connected to the collector is a measure of the ion current. The voltage signal from the resistor is then amplified by an amplifier. The measured and amplified ion currents are directly proportional to the number of ions and number of charges per ion. Therefore, the response of the Faraday cup depends upon the number of the ions collided with the collector. Faraday cup detectors are simple, inexpensive, rugged and reliable. They have high accuracy and constant sensitivity. The principal disadvantage of the Faraday cup is that the low detection limit of ions is relatively high. It is caused by its amplification system and electrical noise. Thus, this prior art method cannot be used to quantify extremely low concentrations of ions in gases.

It is known to use mass spectrometry to detect ions in a gas and to carry out a mass analysis of the ions and to identify the ions, e.g. a mass spectrometer is used as a detector coupled with gas chromatography. A mass spectrometer usually contains an electron multiplier connected to a measuring apparatus. In the electron multiplier electrons collide with surface elements and cause an electric current which is amplified in the measuring apparatus. Collision of charged particles with the surface is the main element of the ion detection. Thus, in both mass spectrometer and a Faraday cup the ion detection is caused by transferring electric charges from ions to a surface connected to a measuring apparatus.

In a method for using a mass spectrometer for the identification of complex compounds, ions of the compound are generated by an ion source and these ions are then collided with neutral gaseous compounds to produce charged fragments of the ions, the mass spectra of these charged fragments are analysed and the identity of the original ions obtained from these spectra.

U.S. Pat. Nos. 4,588,889 and 5,097,124 disclose such methods.

In WO 99/30350 there is disclosed a method of analysing ions which is carried out in a mass spectrometer apparatus comprising an ion source, a linear RF quadrupole and a time of flight mass spectrometer. Ions are generated from the ion source and passed into the linear RF quadrupole. To retain ions within the linear RF quadrupole, potentials are applied to either end of it and it is then operated as an ion trap. Ions of interest are selected in the linear RF quadrupole and unwanted ions are caused to be ejected. Selected ions are then excited and caused to collide with a neutral gas, to cause collision induced dissociation thereof, thereby forming fragment ions for analysis in the time of flight mass spectrometer. The potential of one end of the linear RF quadrupole is then adjusted to pass selected and fragment ions through to the time of flight mass spectrometer. This enables a spectrum of the selected and the fragment ions to be obtained from the time of flight mass spectrometer.

In these methods of using a mass spectrometer, a charged ion is produced and this charged ion is split into charged fragments which are subjected to an electric field and a mass spectrometric analysis to obtain a spectrum and to identify the compound.

However this is not the same as counting the number of ions in a gaseous sample and such methods cannot be used to count the number of ions.

An important practical disadvantage of using a mass spectrometer is that it requires a vacuum for the separation and detection of ions and it cannot operate under the atmospheric pressure. Thus, mass spectrometry cannot be employed to quantify in-situ extremely low concentrations of ions in gases because mass spectrometry requires the use of a vacuum and complex and expensive equipment.

In addition, the lowest limit for the concentration of ions which can be detected and quantified with a mass spectrometer is relatively high; this is because of the electrical noise within amplification system and losses caused by the interface to the vacuum system.

We have devised a method and apparatus for counting the number of ions in a gaseous sample which overcomes these problems.

Accordingly, one aspect of the present invention provides a method of counting the number of ions in a gaseous sample which method comprises (i) colliding the ions with uncharged particles of greater mass than the ions to transfer charge from said ions to the uncharged particles to produce charged particles (ii) subjecting the charged and uncharged particles to an electric field to separate the charged particles from the uncharged particles and (iii) numerically counting the number of charged particles.

The electric field preferably directs the charge particles to a counting means which can count the number of particles.

According to another aspect of the invention there is provided an apparatus for counting the number of ions in a gaseous sample which apparatus comprises (i) a mixing chamber (ii) a first inlet in the mixing chamber through which a gaseous sample containing ions can enter (iii) a second inlet in the mixing chamber through which uncharged particles entrained in a gas can enter so that the ions and uncharged particles collide (iv) an outlet from the mixing chamber which discharges to a separation chamber which separation chamber has an electric field generating means and an outlet discharging to a charged particle detecting and numerically measuring means.

The electric field generating means is arranged to be able to subject particles in the separation chamber to an electric field.

The ions and uncharged particles collide with each other as a result of Brownian diffusion and some of the uncharged particles become charged by transfer of charge from the ions.

The charge transfer can occur when a neutral particle and an ion collide to produce a charged particle with a molecule/atom on its surface formed when the ion transfers its charge to the particle. Thus, after the transfer event the particle acquires the charge and keeps the neutralised ion.

Another way the charge transfer a neutral particle can occur is when the particle and an ion collide to produce a particle with an ion on its surface. Thus, after the transfer event the particle acquires the ion and becomes charged.

A third way of the charge transfer a neutral particle can occur is when a particle and an ion collide to produce a charged particle. The ion becomes a neutral molecule/atom and leaves the surface of the particle. Thus, after the transfer event, the particle acquires the charge. The neutralised ion moves in the gas phase separately.

It is not important if both particle and ion are involved in chemical reactions with each other or with third parties. The important point is the charge has to be transferred from an ion to a particle.

In the separation chamber the charged and uncharged particles are separated according to their electric mobility by the imposition of the electric field so that the gas flow from the outlet of the separation chamber contains only charged particles.

In order that all the ions collide with an uncharged particle the number concentration of uncharged particles is in excess of the number concentration of the ions and, more preferably, greatly in excess.

The ions and the uncharged particles are preferably entrained in a gaseous flow and enter the mixing chamber where they collide; preferably they are entrained in air. The uncharged particles and the ions may or may not react when they collide providing a charge transfer event occurs.

The uncharged particles are preferably formed as an aerosol e.g. by using an evaporator and condensation means to produce the uncharged aerosol particles.

The charged particles can be detected and counted individually by means of single particle counting means. The means for counting the particles can be a commercially available optical particle counter such as MetOne (Pacific Scientific Instruments). This optical particle counter enables aerosol particles of the diameter greater than 0.3 μm to be individually counted. Other particle counting means may also be utilised such as light scattering or light absorption detectors or a dust monitor, nephelometer, aethelometer or a condensation particle counter.

The electric field generating means can be two spaced apart electrodes with an electric field generated between them, preferably the electric field is at least 2,000/volts per cm. Typically filed strengths of 5,000 volts/cm to 20,000 volts/cm can be used. Preferably a gaseous flow containing charged and uncharged particles is passed between the electrodes, typically the electrodes can be of the order of 5 mm apart.

Since the charged particles have acquired the electric charges following collisions with ions, the number of charged particles is substantially directly related to the number of ions in the mixing chamber. For unit flow rates, the number of ions in the mixing chamber is proportionate to the number of ions which entered the mixing chamber in the gaseous flow so that the concentration of charged particles is a measure of the concentration of ions in the gaseous sample.

If necessary a correction factor which links the actual concentration of ions with the number concentration of charged particles can be found by means of calibration using mass spectrometry or another suitable techniques.

The flow rates of the gases in the separation chamber have to satisfy "the laminar flow criterion": the linear velocity of the flows have to be equal to prevent turbulence.

Any type of semi-volatile material can be used to generate aerosol particles, for instance glycerol or sulphur. These aerosol particle, suspended in a gas, may be either liquid or solid. Aerosol particles may be produced from a mixture of organic compounds or inorganic substances. Atmospheric aerosol particles may also be used to accept charges in the mixing chamber. Aerosol particles may be also generated from a dust or from a liquid using an atomiser as well as a nebuliser. Particles may also may be in a liquid in the form of a hydrosol or emulsion. Particles generated in these ways have charges. These charges have to be removed by means of a charge neutralisation or removal means employed to remove charged particles from the aerosol flow.

An ion mobility selection unit may be attached to the inlet of the mixing chamber to enable ions of pre-determined mobility to pass into the mixing chamber. Thus, the ions with such pre-determined mobility are selected for the detection and measurement.

An ionisation chamber containing means for effecting ionisation of molecules or clusters of interest to produce ions from non-ionic molecules or clusters may be attached to the inlet of the mixing chamber. This enables a wide range of species, e.g. molecules, free radicals, clusters, nano-particles, and atoms, to be detected and quantified. The ionisation means may comprise a method of ionisation with a degree of selectivity for instance UV radiation of about 10 or 11 eV, in the case of photo-ionisation, the ionisation selectivity may be achieved by choosing the gas containing molecules or atoms with a higher ionisation potential than the energy of the UV source.

For detection of trace species in liquids or solids a liquid or a solid sample may be evaporated first into a gas medium and then treated as a gas sample. Alternatively, a liquid or solid sample may be heated to a predetermined temperature first to release some of the trace species in a gas medium and then the gas medium containing the trace species may be treated as a gas sample.

A plurality of mixing chambers, arranged in series or in parallel, can be used and a plurality of selection chambers, or particle generator means, arranged in series or in parallel can also be used.

Where advantageous, other detectable species such as clusters, nano-particles, and molecules suspended in a gas may be used instead of uncharged aerosol particles.

If desired, a condensation unit, adapted to increase the size and the mass of the charged aerosol particles or the detectable species may be positioned between the separation chamber and the charged particle detecting and numerically measuring means.

Optionally charge neutralisation or charge removal means may be positioned in flows at the second inlet containing uncharged particles to ensure the neutrality of such flows.

If desired, a differential mobility analyser may serve as separation chamber providing a single output or plurality of outputs according to particle mobility.

Counting particles enables very low concentrations of ionised matter to be quantified on-line, e.g. concentrations as low as $1/cm^{-3}$ may be measured reliably. Conventional equipment to count ions in a gas is reliable only down to concentrations of $10^5/cm^{-3}$, thus the present invention is a great improvement over currently used methods and apparatus.

Figure 2:
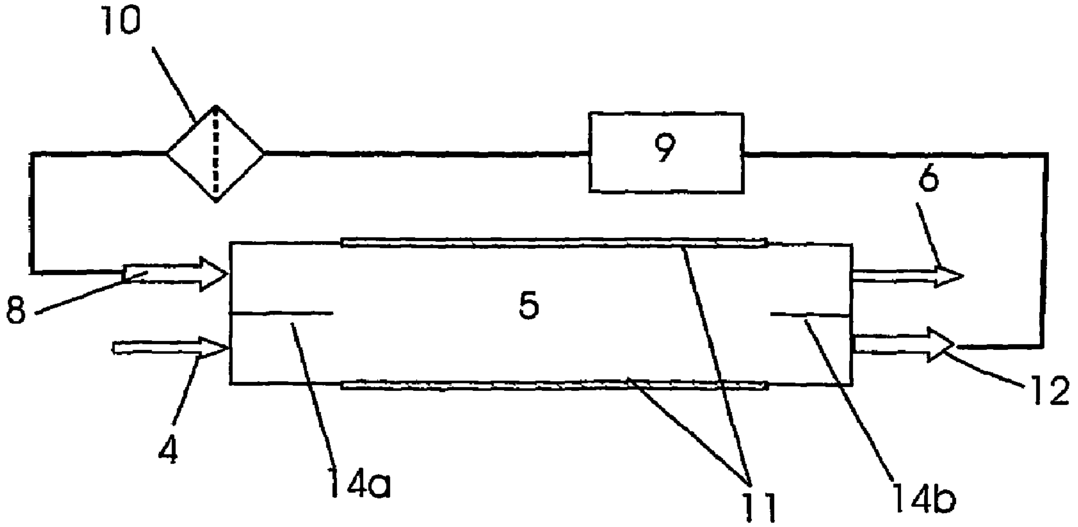

The invention will now be described, by way of example, with reference to the accompanying schematic drawings in which:

FIG. 1 shows schematically an apparatus for detecting the presence of, and measuring extremely low concentrations of ions in gases;

FIG. 2 is a schematic view of the separation chamber together with some associated equipment and FIG. 3 shows schematically examples of charge transfer Referring to FIG. 1, there is shown a mixing chamber (2) having a first inlet (1) for a sample gas flow containing ions, a second inlet (3) for uncharged aerosol particles entrained in a flow of air and an outlet (4) discharging to a separation chamber (5). The outlet from the separation chamber (5)

discharges through connector (6) to optical particle counter (7). There is an exhaust outlet (13) from counter (7).

Referring to FIG. 2 the separation chamber (5) is provided with electrodes (11), producing an electric field, there is an outlet (12), a pump means (9) and an aerosol fibre filter means (10) connected to a third inlet (8) to chamber (5). The electrodes (11) are positioned at upper and lower regions of the chamber (5), the inlet (8) and the outlet (6) are respectively positions at the upper region of the chamber, whilst the inlet (4) and outlet (12) are respectively positioned at the lower region. Flow dividing baffles (14) are positioned in end regions of the chamber.

Referring to FIG. 1 in operation, sample gas containing ions enters the mixing chamber (2) through the first inlet (1) with the flow of the gas sample effected either by force flow maintaining means (not shown) at the inlet or induced flow maintaining means (not shown) at the exhaust outlet (13) from the apparatus. In the mixing chamber (2), the sample gas flow containing the ions is mixed with the air flow carrying the uncharged aerosol particles introduced into the mixing chamber (2) through the inlet (3) with the concentration of the uncharged aerosol particles greatly in excess of the concentration of ions. The ions and aerosol particles collide with each other as a result of Brownian diffusion and some of the aerosol particles become charged by transfer of charge from the ions. Thus, the flow discharged from the mixing chamber (2) contains both charged and uncharged aerosol particles and passes to the separation chamber (5), where charged and uncharged aerosol particles are separated according to their electric mobility by the imposition of the electric field to the effect that at the outlet (6) from the chamber (5) the gas flow contains only charged aerosol particles.

The charged aerosol particles entrained in the gas flow discharge through connector (6) into the optical particle counter (7) where the charged aerosol particles are detected and counted. Since the charged aerosol particles have acquired the electric charges following collisions with ions, the number of charged aerosol particles is substantially related to the number of ions in the mixing chamber (2). For unit flow rates, the number of ions in the mixing chamber (2) is proportionate to the number of ions entered the mixing chamber (2) in the sample gas so that the concentration of charged particles is indicative of the concentration of ions in the sample gas.

A correction factor that links the actual concentration of ions with the number concentration of charged particles can be found by means of calibration using mass spectrometry or another suitable techniques.

Referring to FIG. 2 (which may be in the form of a commercially available differential mobility analyser column) following separation, the gases with entrained neutral particles are recycled through an outlet (12), a pump means (9) and an aerosol fibre filter means (10) to an inlet (8). In operation, the gas flow with both charged and neutral aerosol particles enters the separation chamber (5) through the inlet (4) and the neutral particles are carried with the gas flow to the outlet (12). The charged particles are urged upwardly and towards the outlet (6) by the effect of the electric field generated by the energised electrodes (11). The uncharged particles leave the separation chamber (5) at outlet (12) and are pumped by pump (9) through filter (10) to inlet (8) of chamber (5). The baffles (14*b*) facilitate the separation of the charged and uncharged particles. The charged particles entering chamber (5) through inlet (4) are thereby urged into the flow of filtered gas from the inlet (8). The flow rates of the gases in the separation chamber (5) have to satisfy "the laminar flow criterion": the linear velocity of the flows have to be equal.

In an embodiment of the apparatus used in the example below, the mixing chamber (2) was manufactured from brass having the shape of a cylinder of the internal volume of 0.5 litres. All the inlets and connectors were made from brass and copper. The separation chamber (5) was of rectangular cross-section and manufactured from aluminium with copper electrodes (11) insulated and placed inside the chamber. The distance between the electrodes was 5 mm and the voltage was from 1000 to 10,000 Volts DC.

Figure 3A:
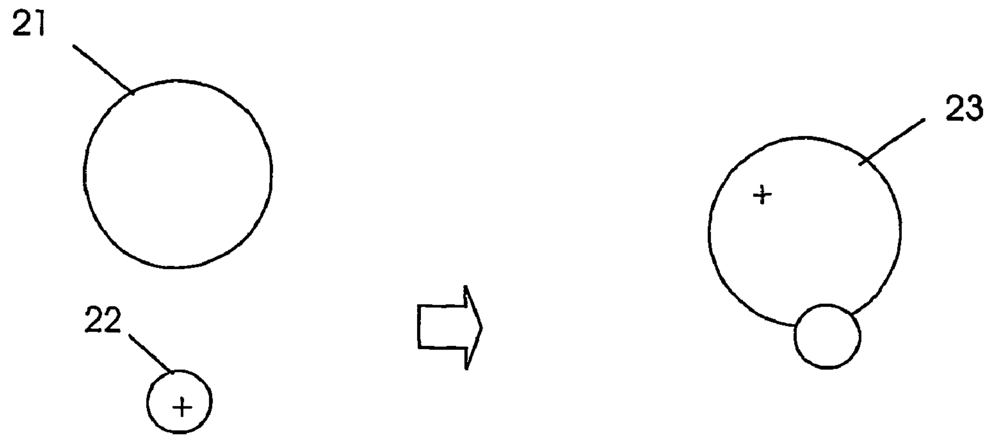

Referring to FIG. 3 one way of the charge transfer is shown in FIG. 3*a*. A neutral particle (21) and an ion (22) collide to produce a charged particle (23) with a molecule/atom on its surface formed when the ion transfers its charge to the particle.

Thus, after the transfer event the particle acquires the charge and keeps the neutralised ion.

Figure 3B:
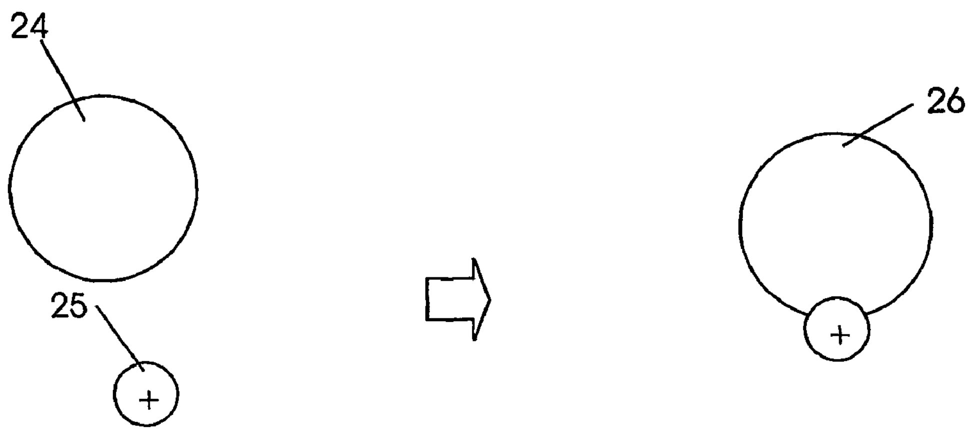

Another way of the charge transfer is presented in FIG. 3*b*. A neutral particle (24) and an ion (25) collide to produce a particle (26) with an ion on its surface. Thus, after the transfer event the particle acquires the ion and becomes charged.

Figure 3C:
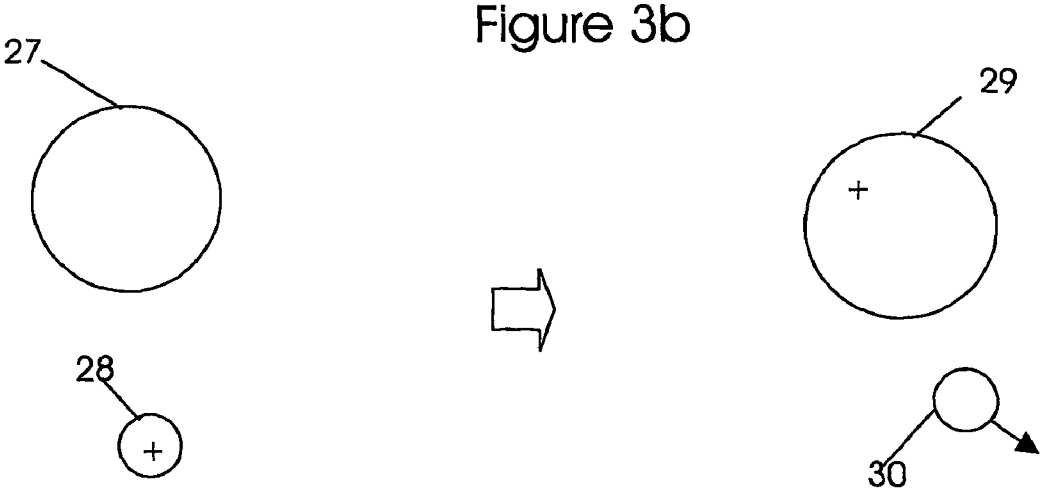

A third way of the charge transfer is shown in FIG. 3*c*. A neutral particle (27) and an ion (28) collide to produce a charged particle (29). The ion becomes a molecule/atom (30) and leaves the surface of the particle. Thus, after the transfer event, the particle acquires the charge. The neutralised ion moves in the gas phase separately.

EXAMPLE

In the Example a commercial optical aerosol particle counter MetOne (Pacific Scientific Instruments) was used to count particles. This optical particle counter enables aerosol particles of the diameter greater than 0.3 μm to be individually counted.

In a test, ions have been formed in the air using $^{241}$Am (0.9 μCi) α-particle emitter. Uncharged aerosol particles were generated from glycerol by an aerosol generator based upon gas-to-particle conversion mechanism. The particle number concentration depends upon the flow rate through the aerosol generator and evaporation temperature. The number concentration of glycerol particles was in the range from $10^9$ to $10^{12}$/m$^{-3}$. The flow rate was maintained by a pump and quantified by a rotameter: the range of the flow rate was from 0.2 to 2 litres/min.

The apparatus of FIGS. 1 and 2 was used to count the number of ions, and the sample air flow containing the ions was drawn to the mixing chamber (2) through the inlet (1) by an exhaust pump (not shown) connected to the optical particle counter (7) to mix with the uncharged glycerol aerosol particle flow in the mixing chamber. In the mixing chamber (2) the ions collided with the uncharged glycerol aerosol particles and some of aerosol particles became charged. The flow discharged from the mixing chamber (2) contained both charged and uncharged glycerol aerosol particles and the flow containing the charged and uncharged aerosol particles than entered the separation chamber (5), through the outlet connector (4). In the separation chamber (5), charged and uncharged glycerol aerosol particles were separated according to their electric mobility in the electric field such that at the outlet (6) of the chamber (5) the gas flow contained only charged glycerol aerosol particles of about 1 μm mean diameter. The charged glycerol aerosol particles were carried by the gas flow through the outlet connector (6) into the optical particle counter (7). The concentration of ions in the air formed by the radioactive source $^{241}$Am was found to be $2\times10^{2}$ $cm^{-3}$. In other experiments, recorded concentrations were in the range from 7 to 3000 $cm^{-3}$.

It will be appreciated that an ion mobility selection unit may be attached to the inlet (1) to enable ions of pre-determined mobility to pass into the mixing chamber (2). Thus, the ions with such pre-determined mobility are selected for the detection and measurement.

It will further be appreciated that an ionisation chamber containing means for effecting ionisation of molecules or clusters of interest, for instance UV radiation of about 10 or 11 eV may be attached to the inlet (1) of the mixing chamber. This enables a wide range of species, e.g. molecules, free radicals, clusters, nano-particles, and atoms, to be detected and quantified.

If desired, a condensation unit, adapted to increase the size and the mass of the charged aerosol particles or the detectable species may be positioned between the separation chamber (5) and the charged aerosol particle detector (7)

Where appropriate, charge neutralisation or charge removal means may be positioned in flows at the inlet (3) and (8) containing uncharged aerosol particles to ensure the neutrality of such flows.

If desired, a differential mobility analyser may serve as separation chamber (5) providing a plurality of outputs according to particle mobility.

The invention claimed is:

1. A method counting, without using a vacuum, individual ions in a gaseous sample which method comprises:

(i) colliding said ions with uncharged particles and transferring a charge from said ions to the uncharged particles so as to produce charged particles, each of said uncharged particles having a mass greater than one of said ions and of a size sufficient to be detected and counted by a single particle counting method;

(ii) subjecting the charged and uncharged particles to an electric field and separating the charged particles from the uncharged particles; and (iii) counting the number of charged particles using said single particle counting method.

2. The method according to claim 1 wherein said gaseous sample comprises a gas at or near atmospheric pressure.

3. The method according to claim 1 wherein the gaseous sample comprises a steady flow of gas containing said ions, the method further comprising the step of combining and mixing said steady flow of gas containing said ions with a steady flow of gas comprising said uncharged particles to form a combined flow, and performing step (ii) by subjecting said combined flow to said electric field.

4. The method according to claim 1 in which the number concentration of said uncharged particles is in excess of the number concentration of said ions.

5. The method according to claim 1 wherein said uncharged particles comprise particles of greater than or equal to 0.3 μm diameter.

6. The method according to claim 1 in which the uncharged particles are formed as an aerosol.

7. The method according to claim 6 in which the aerosol is produced by an evaporator and condensation means operatively configured to produce the uncharged aerosol particles.

8. The method according to claim 7 in which the charged aerosol particles or a detectable species thereof are increased in size and/or mass by subjecting the charged particles to a condensation process.

9. The method according to claim 1 in which the uncharged particles are a liquid or in the form of a hydrosol or emulsion.

10. The method according to claim 1 in which charged particles of pre-determined mobility are selected by means of an ion mobility selection unit and passed through the electric field to separate the charged particles from the uncharged particles.

11. The method according to claim 1 for the detection of trace species in a liquid or solid comprising:

a step of first evaporating a sample of said liquid or solid into a gas medium to he treated as said gaseous sample;

or a step of first heating a sample of said liquid or said solid to pre-determined temperature so as to release some of said trace species into a gas medium to be treated as said gaseous sample.

12. The method according to claim 1 wherein the charged and uncharged particles are subjected to an electric field to separate the charged particles from the uncharged particles in a separation chamber comprising a differential mobility analyzer.

13. The method according to claim 1 in which the charged particles impinge upon a detecting and numerical measuring means in a manner indicative of the magnitude of the respective charge.

14. The method according to claim 1 in which ions of pre-determined mobility are selected by means of an ion mobility selection unit before performing step (i).

15. The method according to claim 1 wherein step (ii) comprises passing said charged and uncharged particles into a separation chamber and then subjecting said charged and uncharged particles to said electric field such that substantially all of said charged particles become separated from said uncharged particles, irrespective of the electric mobility thereof.

16. The method according to claim 15, further comprising the steps of: passing two streams of gas through said separation chamber, a first stream of gas comprising said charged and uncharged particles, and a second stream of gas comprising neutral molecules thereof, each stream of gas having a substantially laminar flow through said separation chamber; orienting said electric field across said two streams of gas, whereby said charged particles are caused to move from said first stream of gas to said second stream of gas, and said substantially laminar flow of both streams of gas inhibits said uncharged particles mixing with said second stream of gas; and outputting said second stream of gas from said separation chamber into a single particle counter.

17. The method according to claim 1 in which said single particle counting method is carried out by an optical particle counter, a light scattering or light absorption detector, a dust monitor, a nephelometer, an aethelometer or a condensation particle counter.

18. An apparatus for counting without using a vacuum individual ions in a gaseous sample which apparatus comprises:

(i) a mixing chamber;

(ii) a first mixing chamber inlet in the mixing chamber through which a gaseous sample containing ions can enter;

(iii) a second mixing chamber inlet in the mixing chamber through which uncharged particles entrained in a gas can enter, each of said uncharged particles having a mass greater than one of said ions and of a size detectable and countable by a single particle counting apparatus, the mixing chamber being operatively configured to facilitate collisions between the ions and the uncharged particles whereby charge is transferred from said ions to the uncharged particles so as to produce a mixture of charged particles and uncharged particles; and (iv) a mixing chamber outlet from the mixing chamber so as to allow discharge of said mixture of particles into a separation chamber, which separation chamber comprises:

a first inlet and a first outlet, said first inlet for allowing a first stream of gas comprising said mixture of particles to pass into said separation chamber from said mixing chamber outlet toward said first outlet;

a second inlet and a second outlet for allowing a second stream of gas to pass through said separation chamber in substantially the same direction as said first stream of gas; and an electric field generating means for generating an electric field across said first and second streams of gas;

(v) said apparatus further comprising a filter means for filtering particles from a gas supply before said gas passes into said separation chamber through said second inlet;

the arrangement in use, causing said charged particles to move from said first stream of gas to said second stream of gas such that said charged particles leave said separation chamber through said second outlet, and said uncharged particles remain in said first stream of gas such that said uncharged particles leave said separation chamber through said first outlet, and which second outlet is connectable to a single particle counting apparatus capable of counting individual charged particles removed from said separation chamber through said second outlet.

19. The apparatus according to claim 18 further comprising a single particle counting apparatus that comprises an optical particle counter, a light scattering or light absorption detector, a dust monitor, nephelometer, aethelometer or a condensation particle counter.

20. The apparatus according to claim 18 in which the electric field generating means comprises two spaced apart electrodes for generating an electric field therebetween, which electric field is sufficient to move said charged particles.

21. The apparatus according to claim 18 further comprising an ion mobility selection unit attached to said first inlet of the mixing chamber to enable ions of pre-determined mobility to pass into the mixing chamber.

22. The apparatus according to claim 18 in which there is an ionization chamber containing ionization means for effecting ionization of molecules or clusters of interest, attached to said first inlet of the mixing chamber.

23. The apparatus according to claim 18 wherein a condensation unit, adapted to increase the size and/or mass of the charged particles or the detectable species, is positioned between the separation chamber and the means for charged particle detection and numerically measurement.

24. The apparatus according to claim 18 in which there is a charge neutralisation or charge removal means positioned before the second inlet of said mixing chamber to ensure the neutrality of particles flowing through the inlet.

25. The apparatus according to claim 18 wherein an evaporator and, optionally, a condensation means are arranged to produce the uncharged particles, or uncharged nano-particles, or neutral clusters, suspended in a gas medium, connected to the second inlet to the mixing chamber.

26. The apparatus according to claim 18 wherein a second outlet from said separation chamber is connected through a pump means and an aerosol filter means to a third inlet into said separating chamber, discharging from the mixing chamber in parallel with and adjacent to inlet to said separating chamber.

27. The apparatus according to claim 18, wherein said first inlet of said separation chamber is opposite said first outlet, and said second inlet of said separation chamber is opposite a second outlet, the arrangement being such that, in use, a substantially laminar gas flow is established between said first inlet and said first outlet and between said second inlet and said second outlet respectively, said electric field generating means causes said charged particles to move from one laminar flow to the other whereby said charged particles are removed through said second outlet and said uncharged particles are removed through said first outlet.

28. The apparatus according to claim 27 in which said first outlet from the separation chamber is connected through pump means and said filter means to said second inlet to said separation chamber, whereby said filter means filters uncharged particles from said gas leaving said separation chamber and subsequently said gas is returned to said separation chamber whereby pressure stability is provided to said laminar gas flows in said separation chamber.

29. The apparatus according to claim 25 wherein in use said evaporator produces between $10^9$ and $10^{12}$ particles/m3.

30. The apparatus according to claim 18 wherein said mixing chamber has a volume of 0.51.

31. The apparatus according to claim 18, wherein said mixing chamber has a volume large enough such that the residence time of said uncharged particles in said mixing chamber is greater than the collision time between said ions and said uncharged particles.

32. The apparatus according to claim 18, further comprising a flow dividing baffle between said first inlet and said second inlet, and a flow dividing baffle between said first outlet and said second outlet.

* * * * *